(12) United States Patent
Podgorny

(10) Patent No.: US 12,020,184 B2
(45) Date of Patent: Jun. 25, 2024

(54) SERVICE DETECTION AND RECOMMENDATION SYSTEM

(71) Applicant: Rubicon Technologies, LLC, Atlanta, GA (US)

(72) Inventor: Samantha Spring Podgorny, Cumming, GA (US)

(73) Assignee: Rubicon Technologies Holdings, LLC, Atlanta, GA (US)

( * ) Notice: Subject to any disclaimer, the term of this patent is extended or adjusted under 35 U.S.C. 154(b) by 353 days.

(21) Appl. No.: 17/316,617

(22) Filed: May 10, 2021

(65) Prior Publication Data

US 2021/0264330 A1 Aug. 26, 2021

Related U.S. Application Data

(63) Continuation of application No. 16/927,862, filed on Jul. 13, 2020, which is a continuation of application
(Continued)

(51) Int. Cl.
*G06Q 10/047* (2023.01)
*B65F 3/00* (2006.01)
(Continued)

(52) U.S. Cl.
CPC ............ *G06Q 10/047* (2013.01); *B65F 3/00* (2013.01); *G01B 11/26* (2013.01); *G06N 20/00* (2019.01);
(Continued)

(58) Field of Classification Search
CPC ...... G06Q 10/047; G06Q 10/30; G06Q 10/00; G06Q 10/04; B65F 3/00; B65F 2210/168; G01B 11/26; G01B 11/022; G06N 20/00
See application file for complete search history.

(56) References Cited

U.S. PATENT DOCUMENTS 9,741,183 B2 * 8/2017 Matos ................... H04W 48/20
9,824,337 B1 * 11/2017 Rodoni ............... G06F 3/04817
(Continued)

FOREIGN PATENT DOCUMENTS

EP  2072420 A1  6/2009
EP  3211570 A1  8/2017
(Continued)

OTHER PUBLICATIONS

PCT/US2019/064528, "International Search Report and the Written Opinion", dated Feb. 19, 2020, 8 pages.
(Continued)

*Primary Examiner* — Tom Y Lu
(74) *Attorney, Agent, or Firm* — Kilpatrick Townsend & Stockton LLP

(57) ABSTRACT

A system is disclosed for managing waste services. The system may include a waste detector mounted onboard a service vehicle and configured to capture image data of a receptacle encountered by the service vehicle. The system may also include a display, and a controller in communication with the waste detector and the display. The controller may be configured to recognize the receptacle within the image data, and to determine a fill status of the receptacle based on the image data. The controller may also be configured to selectively determine a customer recommendation for a different sized receptacle based on the fill status, and to cause a dispatch to provide the different sized receptacle based on the customer recommendation.

17 Claims, 6 Drawing Sheets

Related U.S. Application Data

No. 16/209,929, filed on Dec. 4, 2018, now Pat. No. 10,713,599.

(51) Int. Cl.
    *G01B 11/26*     (2006.01)
    *G06N 20/00*     (2019.01)
    *G06Q 10/30*     (2023.01)

(52) U.S. Cl.
    CPC ........ *G06Q 10/30* (2013.01); *B65F 2210/168* (2013.01)

(56) References Cited

U.S. PATENT DOCUMENTS

| | | |
|---|---|---|
| 10,332,197 B2 | 6/2019 | Kekalainen et al. |
| 10,635,864 B2 | 4/2020 | Flood |
| 10,713,599 B2 | 7/2020 | Podgorny |
| 2011/0194920 A1* | 8/2011 | Gesuale ............... B65F 3/14 414/467 |
| 2014/0139706 A1 | 5/2014 | Jang et al. |
| 2017/0024269 A1 | 1/2017 | Shuvali et al. |
| 2017/0024369 A1 | 1/2017 | Seagraves et al. |
| 2017/0243269 A1 | 8/2017 | Rodini et al. |
| 2018/0075417 A1 | 3/2018 | Gordon et al. |
| 2018/0174115 A1 | 6/2018 | Rodoni |
| 2020/0082354 A1 | 3/2020 | Kurani |

FOREIGN PATENT DOCUMENTS

| | | |
|---|---|---|
| WO | 2016187677 A1 | 12/2016 |
| WO | 2017216755 A1 | 12/2017 |
| WO | 2018118879 A1 | 6/2018 |

OTHER PUBLICATIONS

U.S. Appl. No. 16/927,862, Non-Final Office Action dated Aug. 31, 2023, 15 pages.

U.S. Appl. No. 16/927,862, "Final Office Action", dated Dec. 12, 2023, 14 pages.

EP19893194.1, "Extended European Search Report", dated Jul. 27, 2022, 10 pages.

\* cited by examiner

SERVICE DETECTION AND RECOMMENDATION SYSTEM

CLAIM OF PRIORITY UNDER 35 U.S.C. § 120

The present Application for Patent is a continuation of patent application Ser. No. 16/927,862 entitled "Service detection and recommendation system" filed Jul. 13, 2020, pending, which is a continuation of patent application Ser. No. 16/209,929 entitled "Service detection and recommendation system" filed Dec. 4, 2018 and issued on Jul. 14, 2020 as U.S. Pat. No. 10,713,599 B2, both of which are assigned to the assignee hereof and hereby expressly incorporated by reference herein in their entirety.

TECHNICAL FIELD

The present disclosure relates generally to a waste management system and, more particularly, to a system for monitoring and recommending waste services.

BACKGROUND

Waste service providers typically dispatch haul vehicles to customer properties according to a predetermined pickup schedule. The pickup schedule is often designed to provide periodic waste removal services within a particular geographical area in an efficient manner. Under a traditional service model, each customer along an established pickup route within a common geographical area receives waste removal services on the same day each week. On this day, waste receptacles on each customer property are emptied by the service provider, regardless of how full each receptacle is. Customers that subscribe to traditional waste removal services are billed on a periodic basis (e.g., monthly, quarterly, etc.) for their subscription.

Although traditional waste removal services can be useful in some instances, they can also be problematic. For instance, some customers fill their receptacles before their next regularly scheduled pickup. In these instances, the customers may be required to use additional on-demand services in order to avoid waste overflow. When the on-demand services are not available or not utilized, the waste may pile up on or around the customer's receptacle and create unsanitary conditions. In other instances, the same or different customers may produce less waste and not require emptying of their receptacle at the scheduled time of service. In this situation, the customers may overpay for their subscription.

The disclosed system is directed to overcoming one or more of the problems set forth above and/or other problems of the prior art.

SUMMARY

In one aspect, the present disclosure is directed to a waste management system. The waste management system may include a waste detector mounted onboard a service vehicle and configured to capture image data of a receptacle encountered by the service vehicle. The waste management system may also include a display, and a controller in communication with the waste detector and the display. The controller may be configured to recognize the receptacle within the image data, and to determine a fill status of the receptacle based on the image data. The controller may also be configured to selectively determine a customer recommendation for a different sized receptacle based on the fill status, and to cause a dispatch to provide the different sized receptacle based on the customer recommendation.

In another aspect, the controller may be configured to determine an identification of a customer associated with the receptacle, and to determine the customer recommendation based at least partially on the identification. The controller may also be further configured to determine the identification based on the image data. The waste management system may further include a location device configured to detect a location of the service vehicle, wherein the controller is in further communication with the location device and configured to determine the identification based on the location of the service vehicle detected at a time of image data capturing. The controller may also be configured to determine a trend of the customer to overfill or underfill the receptacle; and determine the customer recommendation for the different sized receptacle based on the determined trend. The controller may also be configured to provide the image data to a machine-learning (ML) model, wherein the ML model is configured to identify portions of the image data. The controller may be configured to determine existence of waste-related parameters in the image data and selectively determine the fill status of the receptacle based on the waste-related parameters. The waste-related parameters may also include at least one of a receptacle lid angle, a mound height above a top edge of the receptacle, and an amount of waste around a base of the receptacle. In yet another aspect, the controller is further configured to selectively filter the image data based on at least one of a distance from the service vehicle to the receptacle at a time of image data capturing and an angle between the waste detector and the receptacle at the time of image data capturing. In yet another aspect, the display is located offboard the service vehicle. In yet another aspect, the waste management system further includes a sensor configured to generate a signal during servicing of the receptacle by the service vehicle that is indicative of a weight of waste in the receptacle, wherein the controller is in further communication with the sensor and configured to determine the fill status of the receptacle based at least in part on the signal. In yet another aspect, the controller is further configured to automatically schedule the service vehicle to swap out the receptacle based on the customer recommendation.

In yet another aspect, the present disclosure is directed to a method of managing waste services. The method may include capturing image data of a receptacle encountered by a service vehicle, and automatically recognizing the receptacle within the image data. The method may also include determining a fill status of the receptacle based on the image data, and selectively determining a customer recommendation for a different sized receptacle based on the fill status. The method may additionally include automatically dispatching a vehicle to provide the different sized receptacle based on the customer recommendation. In another aspect, the method may further include identifying a customer associated with the receptacle, wherein selectively determining the customer recommendation includes determining the customer recommendation based at least partially on an identity of the customer. Identifying the customer may include identifying the customer based on the image data. The method may also further include detecting a location of the first service vehicle at a time of image data capturing, wherein identifying the customer includes identifying the customer based at least partially on the location of the first service vehicle. The method may also further include determining a trend of the customer to overfill or underfill the receptacle, wherein selectively determining the customer recommendation includes determining the customer recommendation based on the trend. The method may also further include determining existence of waste-related parameters in the image data, wherein determining the fill status of the receptacle includes determining the fill status of the receptacle based on the waste-related parameters. The waste-related parameters may include at least one of a receptacle lid angle, a mound height above a top edge of the receptacle, and an amount of waste around a base of the receptacle.

In yet another aspect, the present disclosure is directed to a non-transitory computer readable medium containing computer-executable programming instructions for performing a method of waste service management. The method may include capturing image data of a receptacle encountered by a first service vehicle using a waste detector, and automatically recognizing the receptacle within the image data. The method may also include determining from the image data a fill status of the receptacle based on at least one of a receptacle lid angle, a mound height above a top edge of the receptacle, and an amount of waste around a base of the receptacle. The method may further include identifying a customer associated with the receptacle based on the image data and determining a trend of the customer to overfill or underfill the receptacle. The method may additionally include selectively determining a recommendation for the customer for a different sized receptacle based on the trend, and automatically dispatching a second service vehicle to provide the different sized receptacle based on the recommendation.

DETAILED DESCRIPTION

Figure 1:
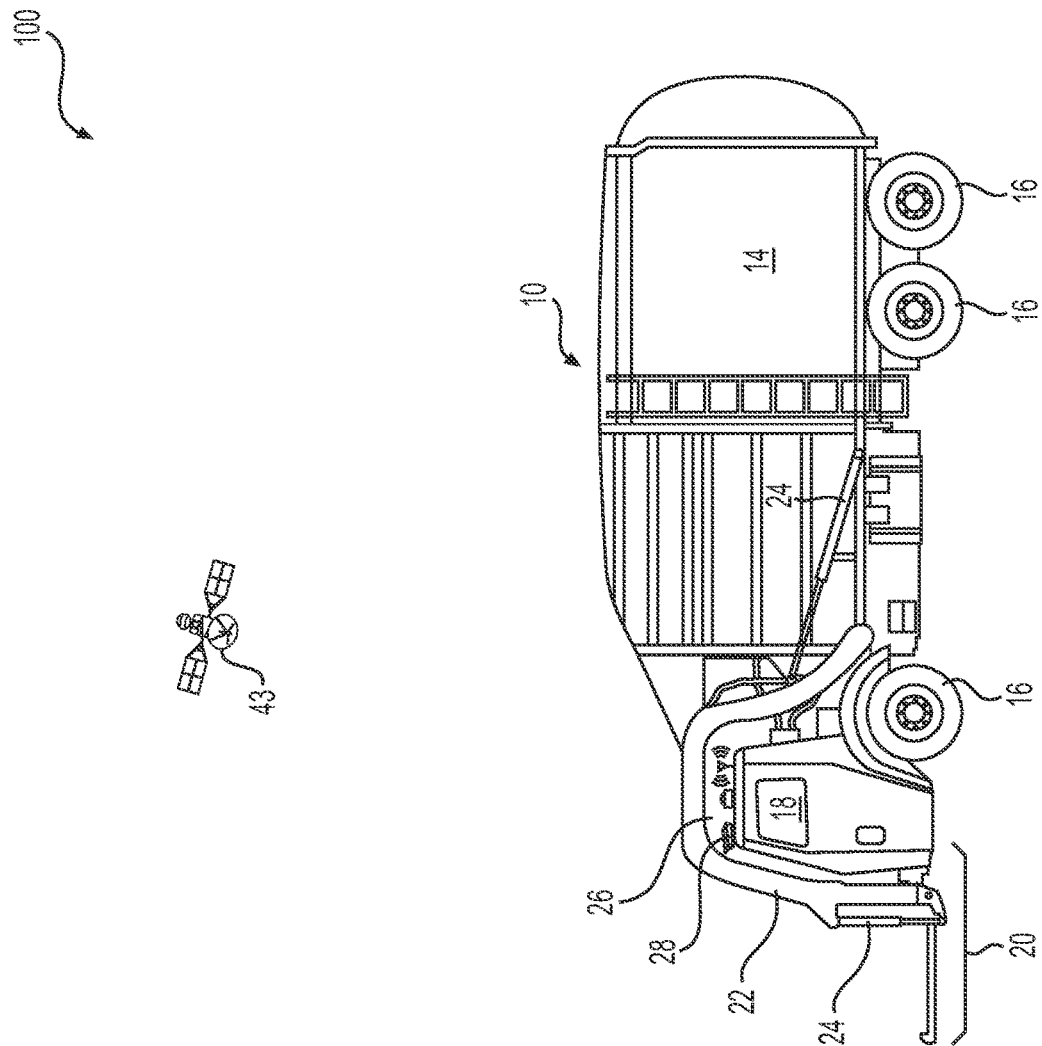
FIG. 1 is an isometric illustration of an example waste service vehicle.
Figure 1:
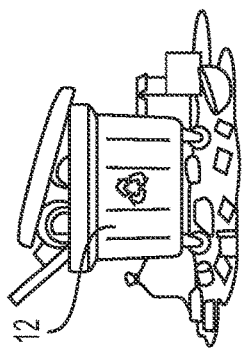

FIG. 1 illustrates an example system 100 including waste service vehicle 10 that is configured to service a receptacle 12. The service may include, for example, the removal of waste from inside of receptacle 12, the removal of receptacle 12, and/or the placement of new or additional receptacles 12 at a particular customer location.

Service vehicle 10 may take many different forms. In the example shown in FIG. 1, service vehicle 10 is a hydraulically actuated, front-loading type of service vehicle. Specifically, service vehicle 10 may include a bed 14 supported by a plurality of wheels 16, a cab 18 located forward of bed 14, and a lifting device 20 extending forward of cab 18. Lifting device 20 may consist of, among other things, one or more lift arms 22 that are configured to engage and/or grasp receptacle 12, and one or more actuators 24 connected to lift arms 22. Actuators 24 may be powered (e.g., by pressurized oil) to raise lift arms 22 and receptacle 12 up past cab 18 to a dump location over bed 14. After dumping of receptacle 12, actuator(s) 24 may allow lift arms 22 and receptacle 12 to lower back to the ground in front of service vehicle 10.

In another example (not shown), service vehicle 10 is a flatbed or roll-off type of service vehicle. Specifically, lifting device 20 may extend rearward of cab 18 and be powered to raise receptacle 12 up onto bed 14 for transportation of receptacle 12 away from the environment. After dumping of receptacle 12 at a landfill (or swapping of a full receptacle 12 for an empty receptacle 12), receptacle 12 may be returned to the service location and lowered back to the ground behind service vehicle 10.

In some examples, vehicle 10 may be remotely controlled or may be partially or totally autonomous, such as partially or totally autonomous vehicle systems and methods disclosed in U.S. Pat. No. 9,330,571, which is incorporated by reference in its entirety. In some examples, vehicle 10 may contain one or more vehicle operation sensors, such as external sensors, which may include cameras, lasers, sonar, radar detection units (e.g., ones used for adaptive cruise control), and/or the like and/or combinations thereof, and may provide data updated in real-time, updating output to reflect current environment conditions.

In other examples (not shown), lifting device 20 is located to pick up receptacles 12 from a side of service vehicle 10. Other configurations (e.g., manual-loading configurations) may also be possible.

Service vehicle 10 may be provided with a receptacle monitoring system ("system") 200 that can be used to monitor an amount of waste discarded (e.g., inside of, on top of, and/or adjacent to receptacle 12) at a particular customer location and/or a fill status of receptacle 12 at a time of servicing.

Figure 2:
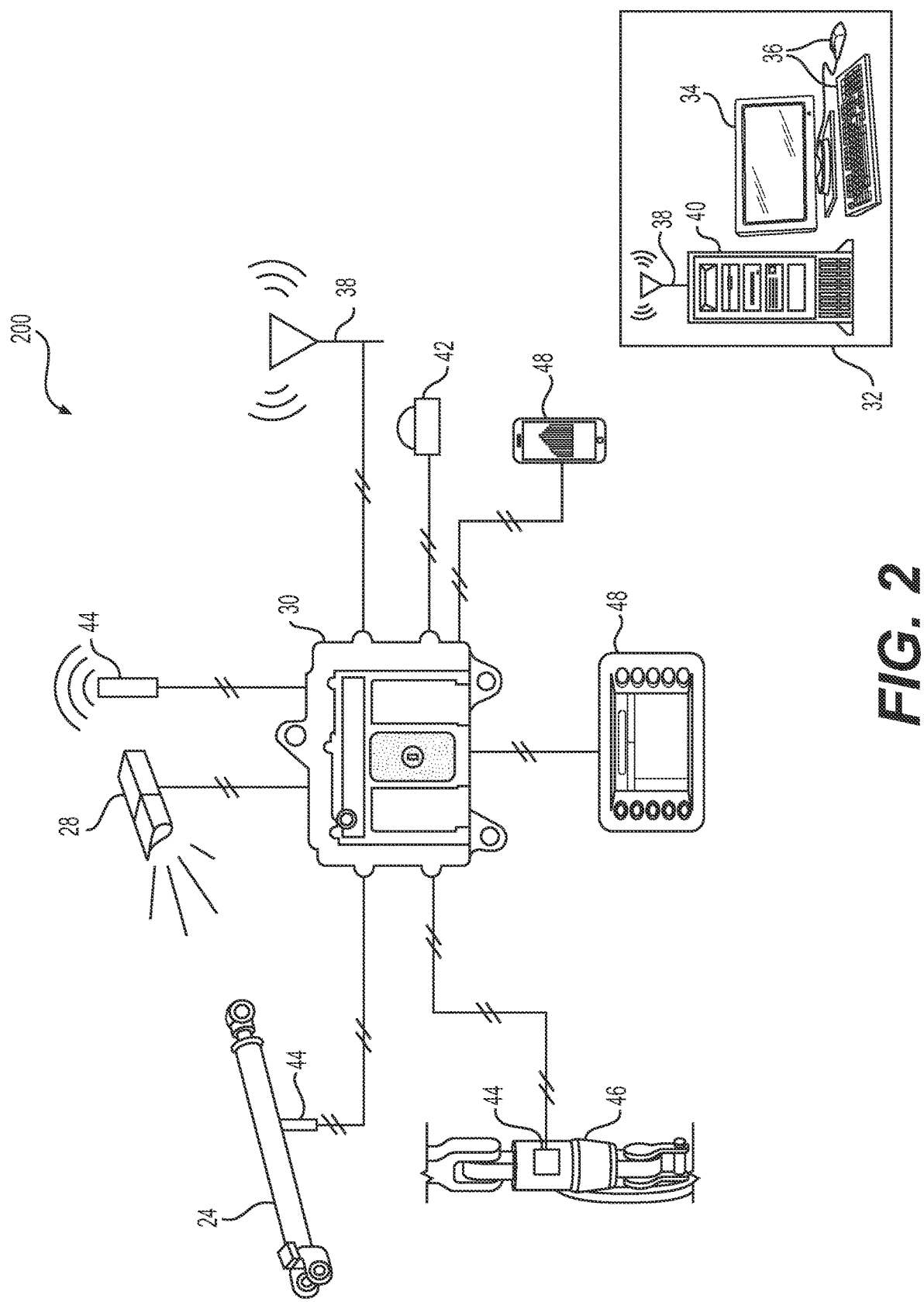
FIG. 2 is a diagrammatic illustration of an example management system for use with the waste service vehicle of FIG. 1.

As shown in FIG. 2, system 200 may include, among other things, at least one waste detector 28, and a controller 30 in communication with waste detector 28. Waste detector 28 may be configured generate signals indicative of the amount of waste in, on, and/or around receptacle 12 as vehicle 10 passes by, approaches, and/or services receptacle 12. Controller 30 may be configured to estimate the amount of waste and/or the receptacle fill status based on the signals, to compare the amount of waste and/or the receptacle fill status to an expected amount and/or fill status, to selectively recommend a different sized receptacle 12 based on the comparison, and/or to automatically schedule swapping of a particular receptacle 12 with a larger or smaller receptacle 12 based on the comparison and/or the recommendation.

Figure 6:
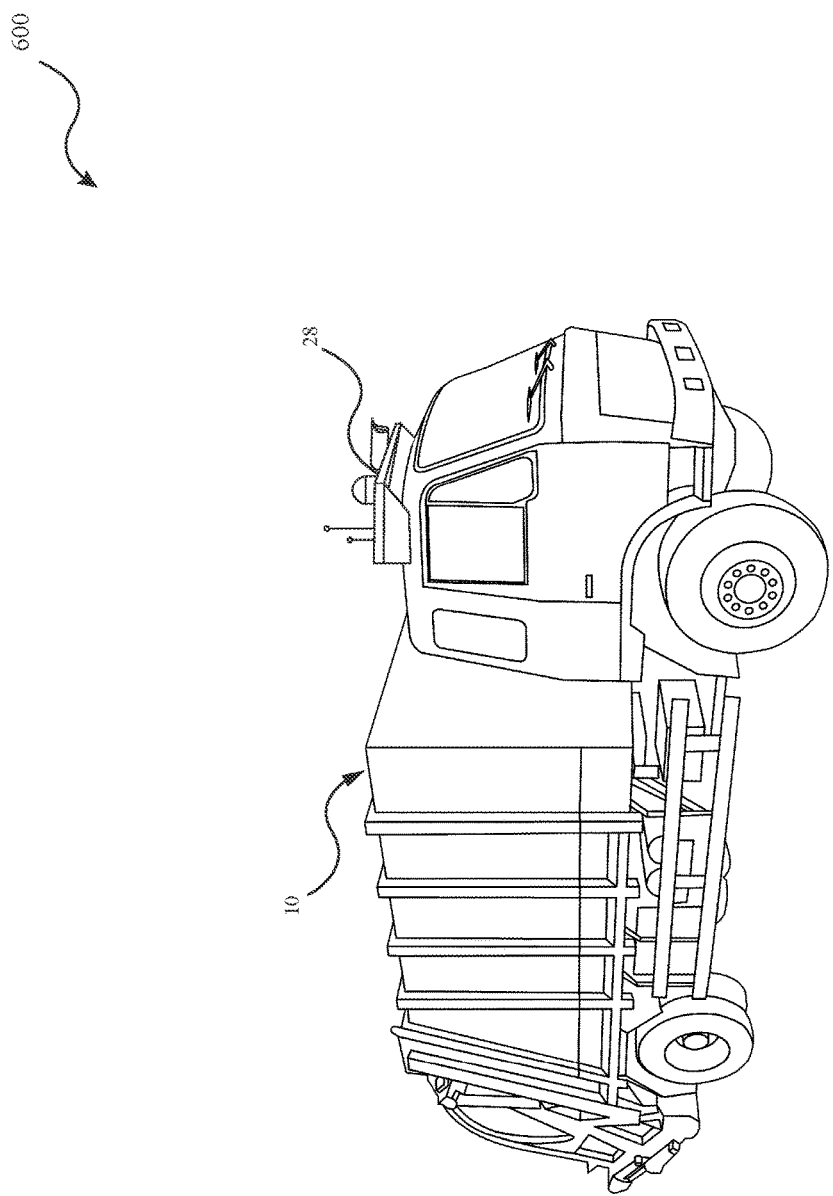
FIG. 6 is an isometric illustration of an example waste service vehicle including a waste detector.

Waste detector 28 may be a standalone device communicatively coupled (e.g., via wires or wirelessly) to the other components (e.g., to controller 30) of system 200 or a device that is integral with the other components. Another example of waste service detector is illustrated in FIG. 6. In one example, waste detector 28 and controller 30 together embody a mobile device (e.g., a smart phone or a tablet) that is temporarily or permanently mounted to service vehicle 10 (e.g., on a roof of cab 18, on a dash inside of cab 18, on lift arms 22, or at another location). Waste detector 28 can include, among other things, one or more processors, one or more sensors, a memory, and a transceiver. It is contemplated that waste detector 28 can include additional or fewer components. Waste detector 28 may be a part of autonomous control systems of vehicle 10.

The processor of waste detector 28 may be configured with virtual processing technologies and use logic to simultaneously execute and control any number of operations. The processor may be configured to implement virtual machine or other known technologies to execute, control, run, manipulate, and store any number of software modules, applications, programs, data, etc. In some examples, the processor can be configured to execute instructions to receive commands from controller 30 associated with the capture and/or transmission of waste-related data (e.g., video data, still images, shape data, volume data, size data, location data, field-of-view data, etc.). It is contemplated that, in some examples, the processor of waste detector 28 may be omitted and the disclosed functions may be performed directly by controller 30.

The sensor(s) of waste detector 28 may include, for example, a camera, a LIDAR sensor, a RADAR sensor, and/or another type of sensor capable of generating the waste related signals described above. In the disclosed example, waste detector 28 includes a single camera. The camera can embody one or more semiconductor charge-coupled devices (CCD), complementary metal-oxide-semiconductor (CMOS) devices, and other devices capable of providing digital image data (e.g., video and/or still images) to the associated processor and/or to controller 30. The memory of waste detector 28 can be a volatile or non-volatile memory, removable or non-removable. Some common forms of machine-readable media may include floppy disk, flexible disk, hard disk, magnetic tape, any other magnetic medium, CD-ROM, any other optical medium, punch cards, paper tape, any other physical medium with patterns of holes, ROM, PROM, EPROM, FLASH-EPROM, any other memory chip or cartridge, and/or any other medium from which a processor or computer is adapted to read. Some common forms of volatile memory include SRAM, DRAM, IRAM, and/or any other type of medium which retains its data while devices are powered, potentially losing the memory when the devices are not powered. Some common forms of memory store computer executable code such as firmware that causes the processor of waste detector 28 to perform one or more functions associated with image capture, data processing, data storage, data transmitting via the associated transceiver, and/or data receiving via the associated transceiver. In some examples, the memory can include one or more buffers for temporarily storing image data received from the camera (and/or other sensors) of waste detector 28, before transmitting the image data to the associated processor and/or to controller 30.

The transceiver of waste detector 28 may include a wired or wireless communication module capable of sending and receiving data via a network (not shown) or via a direct communication link with one or more components in system 200. In some examples, the transceiver can receive data from the associated processor, including instructions for the processor to activate the camera (and/or other sensors) of waste detector 28 and capture image data, and for the processor to transmit the image data to controller 30 via the transceiver.

Controller 30 can include one or more processing devices configured to perform functions of the disclosed methods. Controller 30 can constitute a single core or multiple cores executing parallel processes simultaneously. For example, controller 30 can be a single-core processor configured with virtual processing technologies. In certain examples, controller 30 uses logical processors to simultaneously execute and control multiple processes. Controller 30 can implement virtual machine or other known technologies to provide the ability to execute, control, run, manipulate, and store multiple software processes, applications, and programs. In another example, controller 30 includes a multiple-core processor arrangement (e.g., dual core, quad core, etc.) configured to provide parallel processing functionalities that allow simultaneous execution of multiple processes. As discussed in further detail below, controller 30 may be specially configured with one or more applications and/or algorithms for performing method steps and functions of the disclosed examples. For example, controller 30 can be configured with hardware and/or software components that enable controller 30 to receive the image data from waste detector 28, process the image data, generate additional waste-related data, and/or selectively transmit to an offboard portal 32 the image and/or additional waste-related data. It is appreciated that other types of processor arrangements could be implemented that provide for the capabilities disclosed herein.

Controller 30 may include a volatile or non-volatile, magnetic, semiconductor, tape, optical, removable, non-removable, or other type of storage device or tangible and/or non-transitory computer-readable medium that stores one or more executable programs, such as a receptacle recognition program, a waste volume determination program, a receptacle recommendation program, and/or a receptacle dispatch program. The computer-readable medium may additionally store data, for example information that is related to a particular customer (e.g., a number of receptacles 12 at a particular customer location, a volume of the receptacles 12, an identification of the receptacles 12, a shape or color of the receptacles 12, a service frequency of the receptacles 12, an amount of waste expected to be encountered during service of the receptacles 12, a customer identity, etc.).

In some examples, the programs executable by controller 30 include an operating system that performs known functions when executed by controller 30. By way of example, the operating system may include Microsoft Windows™, Unix™, Linux™, Apple™ operating systems, Personal Digital Assistant (PDA) type operating systems such as Microsoft CE™, or another type of operating system. Controller 30 may execute communication software that provides communications with offboard portal 32, such as Web browser software, tablet or smart handheld device networking software, etc.

The programs stored within the computer-readable medium of controller 30 may cause waste detector 28, controller 30, and/or offboard portal 32 to perform processes related to generating, transmitting, storing, receiving, indexing, and/or displaying the image data and other waste-related data in association with receptacles 12 encountered (e.g., passed, approached, and/or serviced) by vehicle 10. For example, the programs may be able to configure waste detector 28, controller 30, and/or offboard portal 32 to perform operations including: capturing of the image and other waste-related data, displaying a graphical user interface (GUI) for receiving control instructions, receiving control instructions from the associated user via one or more I/O devices and/or the user interface, processing the control instructions, recommending changes to waste services (e.g., changes in sizing of receptacles 12 at a particular customer location), and/or automatically scheduling and implementing the changes (e.g., dispatching service vehicle 10 to swap out receptacles 12).

Offboard portal 32 may be located, for example, at a back office, and made available for use in remotely viewing and responding to the image and other waste-related data generated by system 200 (e.g., by waste detector 28 and/or controller 30). Offboard portal 32 may include, among other things, a display 34 and one or more I/O devices 36. Display 34 may be a liquid crystal display (LCD), a light emitting diode (LED) screen, an organic light emitting diode (OLED)

screen, and/or another known display device. Display 34 may be used for the rendering of video, still images, graphics, text, and/or audio signals under the regulation of controller 30. I/O devices 36 may be configured to send and receive information, and include, for example, a keyboard, buttons, switches, a touchscreen panel (e.g., a panel integrated with the display), and/or a speaker (e.g., a speaker integrated with the display).

The image and other waste related data that is generated by system 200 may be provided to offboard portal 32 in different ways. In one example, at conclusion of each work shift (or after another specified period of time), the data generated by system 200 may be locally downloaded to offboard portal 32 via a portable medium (e.g., a thumb drive, a flash drive, an external hard drive, etc.) or a communication link (e.g., a wired or wireless link) 38. In some examples, the image and other waste-related data may be remotely transmitted to offboard portal 32 on a periodic or continuous basis. Offboard portal 32 may then be used to view the data and/or receive control instructions from a user regarding how the data is captured, how the data is transmitted, and/or how waste related services are to be changed based on the data.

It is contemplated that offboard portal 32 may be used for only viewing the image and other waste related data and providing corresponding control instructions, or that offboard portal 32 may perform some or all of the processing functions of controller 30 described above. For example, controller 30 could be used to only gather the signals from waste detector 28, packetize the signals, filter the signals, and/or buffer the signals, and then transmit the signals (e.g., via communication link 38) to a controller 40 of offboard portal 32 for remote interpretation and/or processing at the back office. In another example, controller 30 may be completely omitted, and the other components of system 200 (e.g., waste detector 28) may communicate directly with controller 40 via communication link 38. In either situation, controller 40 may estimate the amount of waste in, on, or around receptacle 12 and/or the fill status of receptacle 12 based on the signals from waste detector 28; compare the amount of waste and/or fill status to the expected amount and/or fill status; selectively recommend a different sized receptacle 12 based on the comparison; and/or automatically schedule swapping of a particular receptacle 12. Controller 40 may have similar makeup and configuration as that described above for controller 30.

It is contemplated that, in some examples, auxiliary data already being collected onboard vehicle 10 may be used to enhance or augment the image data collected by waste detector 28 and/or the other waste-related data generated by controller 30. For example, the image and/or other waste-related data may be linked to a detected service location. In one example, the service location is automatically detected via a locating device 42 that is mounted onboard service vehicle 10.

Locating device 42 may be configured to generate signals indicative of a geographical position and/or orientation (e.g., the X-, Y-, and/or Z-stance) of service vehicle 10 relative to a local reference point, a coordinate system associated with a local waste environment, a coordinate system associated with Earth, or any other type of 2-D or 3-D coordinate system. For example, locating device 42 may embody an electronic receiver configured to communicate with a satellite 43 (shown in FIG. 1), or a local radio or laser transmitting system used to determine a relative geographical location of itself. Locating device 42 may receive and analyze high-frequency, low-power radio or laser signals from multiple locations to triangulate a relative 3-D geographical position and orientation.

Based on the signals generated by locating device 42 and based on known kinematics of service vehicle 10, controller 30 may be able to determine in real time, the position, heading, travel speed, linear acceleration, orientation, and/or angular acceleration of service vehicle 10. This information may then be used by controller 30, for example, to initiate generation of the image data described above (e.g., to activate waste detector 28 when vehicle 10 is within a threshold proximity of receptacle 12 and/or when vehicle 10 is moving at a speed less than a threshold speed) and/or to attribute the image and other waste-related data to a particular service location (e.g., to a known location of an existing customer).

It is contemplated that locating device 42 may take another form. In some examples, locating device 42 could be a radio-frequency identifier (RFID) reader configured to interact with an RFID tag located within a surrounding environment (e.g., at a customer location, on receptacle 12, etc.), or another type of scanner configured to read another type of indicia (e.g., a barcode) within the environment. Based on the reading of the RFID tag or other indicia, the location and/or orientation of service vehicle 10 may be linked to the known location of the RFID tag or other indicia within the environment.

In another example, one or more sensors 44 tasked with monitoring servicing of receptacles 12 may be used to increase a fidelity in the estimate determined by controller 30 of the waste in, on, or around receptacles 12. For example, an auditory and/or vibrational type sensor (e.g., a microphone) that is mounted onboard vehicle 10 may be configured to remotely detect sound waves transmitted through the air and/or through a framework of service vehicle 10 that are generated by vehicle 10 during engagement, lifting, and/or dumping of receptacle 12, and convert the sound waves to electrical impulses indicative of a volume and/or weight of the associated waste. In some examples, sensor 44 may be a single- or multi-axis accelerometer configured to generate signals indicative of vibrations, rolling, pitching, and/or yawing of vehicle 10 (e.g., of bed 14). For example, sensor 44 may be configured to detect a rate of change of velocity of bed 14 in the X-, Y-, and/or Z-directions, and to generate corresponding signals indicative of an amount of waste loaded onto vehicle 10 during servicing of different receptacles 12. Sensor 44 may embody a force sensor (e.g., a strain gauge) associated with lift arms 22 or another part of vehicle 10 (e.g., a strut or other suspension or powertrain component 46). Signals generated by sensor(s) 44 may be directed to controller 30 for processing.

In yet another example, an onboard input device 48 may receive manual input from an operator that is indicative of observations made during servicing of vehicle 10. For example, the operator may be able to input a location of a particular receptacle 12; identify the receptacle 12; indicate an amount of waste in, on, or around the receptacle 12; etc. Signals generated by input device 42 may also be directed to controller 30 for processing.

Figure 3:
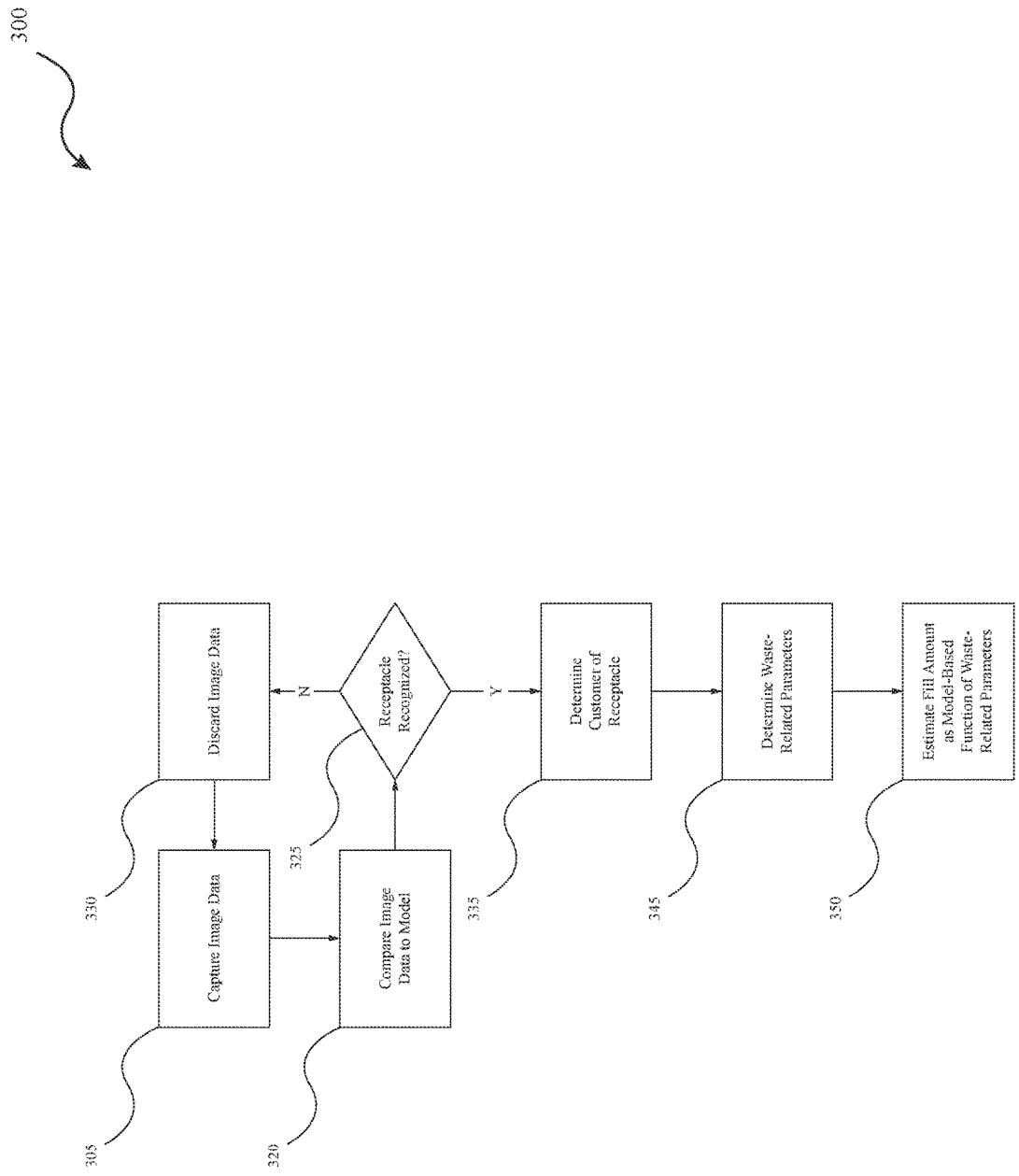
FIG. 3 is a flowchart illustrating an example method of managing waste services that may be performed by the system of FIG. 2.
Figure 4:
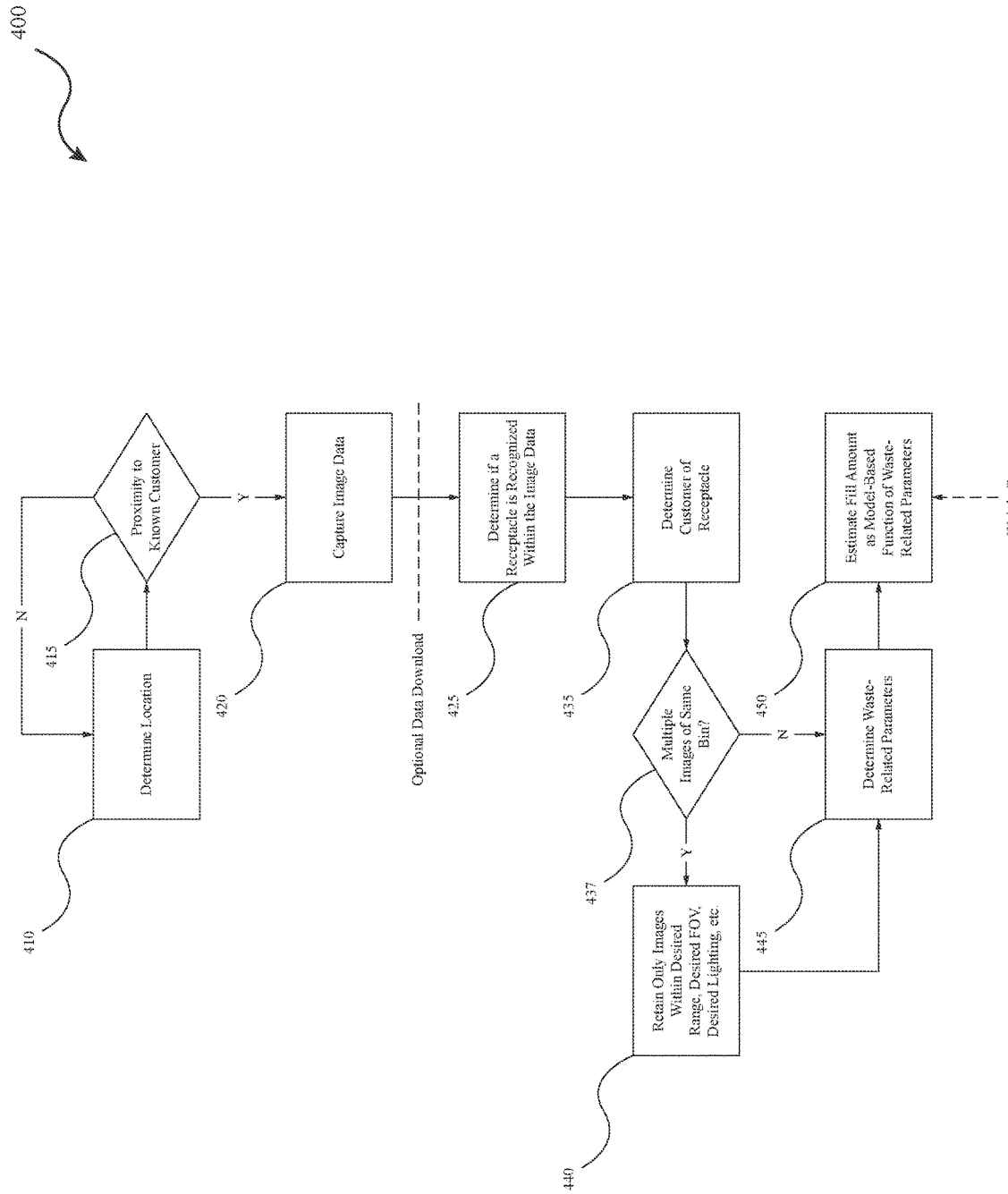
FIG. 4 is a flowchart illustrating an example method of managing waste services that may be performed by the system of FIG. 2.
Figure 5:
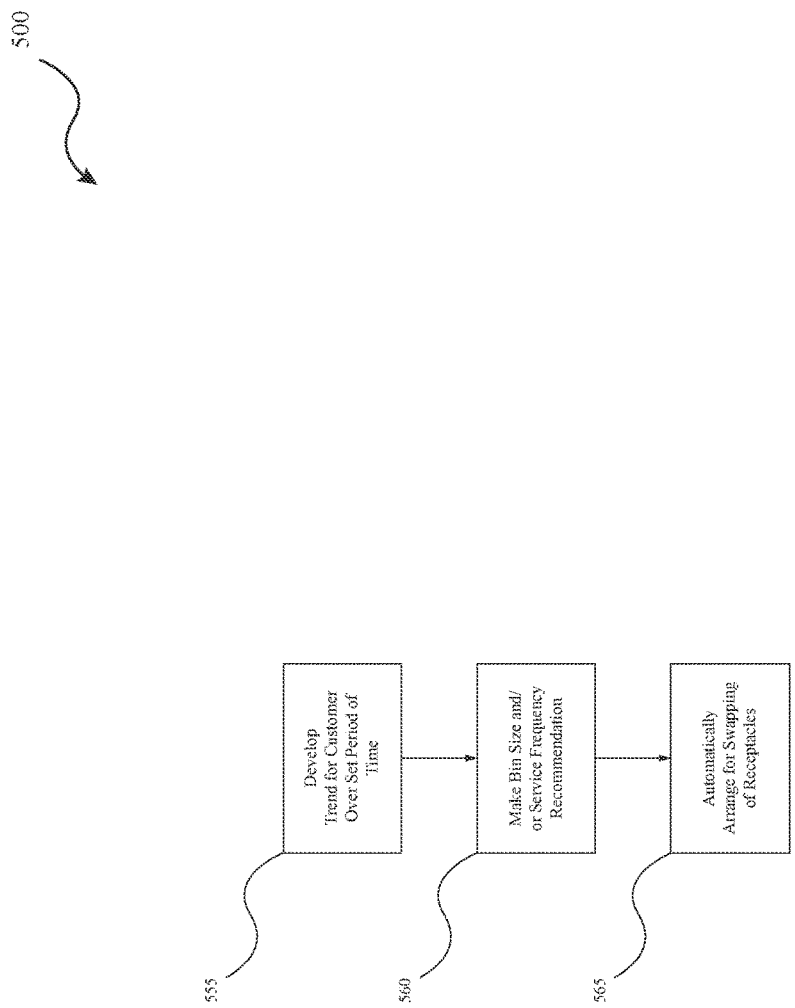
FIG. 5 is a flowchart illustrating an example method of recommending a change in receptacle size for a particular customer that may be performed by the system of FIG. 2.

FIG. 3 illustrates a method 300 associated with an example method that may be performed by system 200 (e.g., by controller 30 and/or controller 40). FIG. 4 illustrates another method 400 associated with an example method that may be performed by system 200 (e.g., by controller 30 and/or controller 40). FIG. 5 illustrates a method 500 associated with an example method that may be performed by system 200 (e.g., by controller 30 and/or controller 40). FIGS. 3-5 are described in more detail below to further illustrate the disclosed concepts.

INDUSTRIAL APPLICABILITY

The disclosed system may be applicable to the waste service industry, where service-monitoring can affect profitability and efficiency. The disclosed system may be used to automatically monitor an amount of waste placed in, on, and/or around a particular receptacle at a particular customer location. In addition, the disclosed system may be used to selectively implement changes to waste services provided at the customer location, based on the monitoring, such that underfilling and/or overfilling of the receptacle may be avoided. Operation of the disclosed system will now be described, with reference to method 300 of FIG. 3.

As shown in FIG. 3, method 300 may begin with the capturing of image data (e.g., digital video and/or still images) by a waste detector, such as waste detector 28 (Step 305). In one example, waste detector 28 continuously captures image data anytime vehicle 10 is operational. In another example, waste detector 28 captures image data periodically (e.g., every three seconds) during vehicle operation. In yet another example, waste detector 28 selectively captures image data based on a triggering condition, such as entering or leaving a geographic area by means of tracking location data and a predetermined virtual geographic boundary that includes the geographic area.

As the image data is being captured by waste detector 28, corresponding signals may be directed to controller 30 (and/or controller 40 via communication link 38). The signals may be used to compare the image data to one or more models stored within the memory of controller 30 (Step 320). The model(s) may include, among other things, a database of features known to be associated with receptacles 12. The features may include, for example, expected colors of receptacles 12, expected shapes, expected sizes, expected components (e.g., a bin portion and a lid portion), expected identification indicia (e.g., indicia affixed to receptacles 12, such as barcodes, writing, numbering, etc.), expected locations and/or orientations, expected vehicle approach angles, etc. Based on this comparison, controller 30 may determine if a receptacle 12 is recognized within the image data (Step 325). When a receptacle 12 is not recognized within the image data, the image data may be discarded (Step 330), and control may return to Step 305.

When a receptacle 12 is recognized within the captured image data during completion of Step 325, controller 30 may then determine the corresponding customer associated with the receptacle 12 (Step 335). This determination may be made in any number of different ways.

In some examples, a known customer may be associated with the receptacle 12 recognized in the image data based solely on the image data. In particular, the image data may include observable indicia (e.g., a bar code, writing, etc.) linking the particular receptacle 12 to the known customer. In some aspects, the image data may include aspects of the environment (e.g., a street sign, a curb-painted address, a building image, or other distinguishing features) around the receptacle 12 that identify the associated known customer. The image data may also include visual aspects of the receptacle 12 (e.g., vehicle approach angles, receptacle orientation, receptacle type, receptacle size, receptacle color, etc.) that are unique to the associated known customer.

In some examples, the identification of image data in an image is made using a machine learning (ML) model that can be trained/tuned based on positive recognition, false recognition, and/or other criteria. Although various types of machine learning models may be deployed to identify image data, in some aspects, one or more ML based classification algorithms can be used. Such classifiers can include, but are not limited to: a Multinomial Naive Bayes classifier, a Bernoulli Naive Bayes classifier, a Perceptron classifier, a Stochastic Gradient Descent (SGD) Classifier, and/or a Passive Aggressive Classifier, or the like. Additionally, the ML models can be configured to perform various types of regression, for example, using one or more various regression algorithms, including but not limited to: a Stochastic Gradient Descent Regressor, and/or a Passive Aggressive Regressor, etc.

In practice, image data is loaded into a image recognition system and exposed to a matching algorithm (e.g., a ML based classifier) that is configured to identify aspects of the environment. Instead of discarding data, when a receptacle is not recognized, the data can be used to train the ML model. In some aspects, portions of the image data may be automatically received and processed by the image recognition system, and may include at least some data that is provided by the user, for example, as part of a manual configuration process.

In some examples, the known customer may be associated with the receptacle 12 based on non-image data received at about the same the time of image data capturing. Specifically, a known customer may be associated with the receptacle 12 recognized in the image data based on signals generated by locating device 42 at the time that the image data is captured. In some aspects, the known customer may be associated with the receptacle 12 recognized in the image data based on operator input received via input device 48 at about that the image data was captured.

Controller 30 may then determine what waste-related parameters exist within the retained images that can be used to estimate the amount of waste in, on, and/or around the recognized receptacle 12 (Step 345). These parameters may include, for example, a lid angle α of receptacle 12 (see FIG. 1), a mound height h of waste above a top edge of receptacle 12, and/or a shape and size s (e.g., length, width, and/or height) of objects around a base of receptacle 12. The existence of the waste-related parameters may be determined by comparison of particular areas (e.g., the area above receptacle 12 and/or the around the base of receptacle 12) within the images of the recognized receptacle 12 with a database of images that include the parameters with varying magnitudes.

Controller 30 may then estimate a fill status of receptacle 12 as a function of the waste-related parameters (Step 350). For example, when a lid angle α is about 0°, the mound height h is about zero, and/or no waste exists around the base of receptacle 12, controller 30 may determine that the receptacle 12 is underfilled at the time of servicing. In another example, when the lid angle α is greater than 0° but less than a threshold angle (e.g., about 0-5°), the mound height h is greater than zero but less than a threshold height (e.g., about 0-5% of a known height of receptacle 12 above an upper edge of receptacle 12), and/or less than a threshold amount of waste (e.g., about 0-5% of a known volume of receptacle 12) is located around the base of receptacle 12, controller 30 may determine that receptacle 12 is adequately filled and ready for servicing. In yet another example, when the lid angle α is greater than the threshold angle, the mound height h is greater than the threshold height, and/or more than the threshold amount of waste is located around the base of receptacle 12, controller 30 may determine that receptacle 12 is overfilled. It is contemplated that any algorithm based on one or more of these parameters may be utilized to determine the fill status of receptacle 12 and/or to quantify the amount of waste in, on, and/or around receptacle 12. It is also contemplated that any one or more of these parameters may be selectively weighted to have a greater affect on the outcome of Step 350.

In some examples, auxiliary data from other onboard devices (e.g., from sensors 44 and/or input device 48) may be utilized to increase a fidelity in the estimate of Step 350. In particular, a weight of receptacle 12 detected during lifting and/or dumping of receptacle 12 and/or an operator's observations may be used to enhance the estimate. In some examples, when the weight of the lifted receptacle 12 is slightly more than a known weight of receptacle 12, a confidence in the estimation of an underfilled receptacle 12 may be increased. Similarly, when the weight of the lifted receptacle 12 is greater than the known weight of receptacle 12, but less than a threshold weight, a confidence in the estimation of a filled receptacle 12 may be increased. And finally, when the weight of the lifted receptacle 12 is greater than the threshold weight, a confidence in the estimation of an overfilled receptacle 12 may be increased. Similar confidence levels may be obtained based on the operator's observations received via input device 48.

As shown in FIG. 4, method 400 may begin with a controller, such as controller 30, which may determine (e.g., based on input from location device 42, sensor(s) 44, and/or input device 48) a location of vehicle 10 (Step 410) and compare the location to a known location of an existing customer (Step 415). When vehicle 10 is within a threshold proximity of the known location, such as 50-500 meters, will controller 30 trigger the capturing of image data by waste detector 28. This may reduce an amount of data that is processed and/or extend a useful life of waste detector 28.

The waste detector 28 begins capturing image data (e.g., digital video and/or still images) (Step 420). In some examples, Step 420 corresponds to Step 305 as part of method 300.

Based on this image data, controller 30 may determine if a receptacle, such as receptacle 12, is recognized within the image data (Step 425). In some examples, Step 425 corresponds to Step 325 as part of method 300.

When a receptacle 12 is recognized within the captured image data during completion of Step 425, controller 30 may then determine the corresponding customer associated with the receptacle 12 (Step 435). In some examples, Step 435 corresponds to Step 335 as part of method 300.

When controller 30 determines the receptacle identification and/or the identification of the known customer associated with the recognized receptacle 12, controller 30 may determine if multiple images of the same receptacle 12 have been captured during the same service event (Step 437). In particular, depending on an image capture rate of waste detector 28 and a travel speed and/or angle of vehicle 10 passing by or approaching receptacle 12, it may be possible for any number of images of the same receptacle 12 to be captured at about the same time. In this situation, controller 30 may be configured to determine an amount of waste in, on, and/or around the receptacle 12 and/or the fill status of receptacle 12 once during the service event. Accordingly, when controller 30 determines that multiple images of the same receptacle 12 have been captured, controller 30 selectively filter the images and retain those images that may produce a most accurate estimate of the amount of waste and/or fill status (Step 440). In some examples, the filtration is part of a ML model that can be trained/tuned based on positive recognition, false recognition, and/or other criteria as described above with respect to method 300. For example, controller 30 may retain images that are taken when vehicle 10 is within a threshold distance of the receptacle 12 (e.g., 50-100 meters), those images taken within a specified view angle of receptacle 12, those images with a minimum clarity or brightness, etc. Any remaining images of the same receptacle 12 may be discarded.

Controller 30 may then determine what waste-related parameters exist within the retained images that can be used to estimate the amount of waste in, on, and/or around the recognized receptacle 12 (Step 445). In some examples, Step 445 corresponds to Step 345 as part of method 300.

Controller 30 may then estimate a fill status of receptacle 12 as a function of the waste-related parameters (Step 450). In some examples, Step 450 corresponds to Step 350 as part of method 300.

As described above, controller 40 could perform any of the disclosed functions instead of or in addition to controller 30 performing the functions. For example, the image data from waste detector 28 could be downloaded to controller 40 between completion of steps 420 and 425, such that controller 40 could complete the remainder of the steps. In some aspects, the image and/or waste related data could be downloaded to a controller 30 after completion of step 450, such that controller 30 could complete the remainder of the steps. For the purposes of this disclosure, it is contemplated that any one or a combination of controllers 30 and 40 may complete any one or more of the steps of FIGS. 3-5.

As shown in FIG. 5, method 500 features a method of recommending a change in receptacle size for a particular customer. One or more Steps not expressly illustrated in FIG. 5 may be included before, after, in between, or as part of Steps 305-350 and/or Steps 410-450.

After the fill status of a particular receptacle 12 corresponding with a particular customer has been estimated, controller 30 may determine if the fill status is trending over a predetermined period of time (Step 555). For example, controller 30 may determine that Customer-X regularly overfills their receptacle 12, while Customer-Y regularly underfills their receptacle 12. This trend detection may be made using any statistical method known in the art.

Controller 30 may then be configured to selectively recommend a change in a receptacle size for a particular customer based on the trend (Step 560). For example, controller 30 may recommend a larger receptacle 12 for Customer-X. In contrast, controller 30 may recommend a smaller receptacle 12 for Customer-Y. This recommendation (and also the fill status, waste amounts, and/or trending, in some examples) may be shown, for example, on display 34 of offboard portal 32.

It is contemplated that controller 30 may automatically recommend a next larger size receptacle 12 when the current receptacle 12 has been regularly over filled, and automatically recommend a next smaller size receptacle 12 when the current receptacle 12 has been regularly underfilled. In some examples, controller 30 may be configured to determine an exact size of replacement receptacle 12 required to accommodate the estimated amount of waste that has been regularly exceeding the capacity of the current receptacle 12 (e.g., the amount of waste above the top edge of receptacle 12 and/or the amount of waste around the base of receptacle 12). In some examples, controller 30 may use a ML algorithm for recommending receptacle size, the ML algorithm being trained/tuned by positive recognition, false recognition, and/or other criteria as described above with respect to FIG. 3.

In some examples, controller 30 may automatically arrange for swapping of receptacles 12 (Step 565). For example, after controller 30 determines the trend of overfilling a particular receptacle 12 at a particular customer location, controller 30 may automatically generate an electronic order (e.g., via communication line 38) for a particular service vehicle 10 to perform the swap of the current receptacle 12 at the customer location for a particular receptacle 12 that is larger. In some examples, controller 30 may additionally schedule and/or dispatch the particular service vehicle 10 to complete the swap. In some examples, an autonomous vehicle could be dispatched to complete the swap.

The disclosed system may provide a way to efficiently customize waste services for customers with varying service needs. Some advantages of disclosed examples include a cleaner environment, lower costs and better service for customers, and increased productivity and profits for the service provider.

In some examples, one or more steps of FIGS. 3-5 may be implemented, at least in part, in the form of executable code stored on non-transitory, tangible, computer readable media that when run by one or more processors (e.g., a processor of the media device) may cause the one or more processors to perform one or more of the steps of FIGS. 3-5.

FIG. 6 illustrates another example system 600 including waste service vehicle 10 that contains at least one waste detector 28. One or more features of vehicle 10 and waste service detector 28 may or may not be depicted in FIG. 6

It will be apparent to those skilled in the art that various modifications and variations can be made to the disclosed system. Other examples will be apparent to those skilled in the art from consideration of the specification and practice of the disclosed system. It is intended that the specification and examples be considered as illustrative only, with a true scope being indicated by the following claims and their equivalents.

What is claimed is:

1. A waste management system, comprising:
    a waste detector mounted onboard a service vehicle and configured to capture image data of a receptacle encountered by the service vehicle;
    a memory containing known customer data comprising customer observable indicia data and receptacle-customer signal data; and
    a controller in communication with the waste detector and the memory, the controller being configured to:
        receive, from the waste detector, image data of a receptacle serviced by the service vehicle and location signal data associated with the receptacle;
        recognize the receptacle within the image data;
        train a matching algorithm classifier by providing image data of the recognized receptacle and the customer observable indicia data;
        compare, in the matching algorithm classifier, the image data to the the customer observable indicia data;
        associate a known customer with the recognized receptacle based on the image data and the location signal data; and
        perform a process related to at least one of transmitting and storing of the image data and other waste-related data associated with the receptable serviced by the service vehicle.

2. The waste management system of claim 1, wherein the controller recognizes observable indicia on or around the receptable that are linked to the known customer.

3. The waste management system of claim 2, wherein the observable indicia comprises at least one of a bar code and writing on or around the receptable that are linked to the known customer.

4. The waste management system of claim 1, wherein the controller recognizes visual aspects of the receptable that are unique to the known customer.

5. The waste management system of claim 4, wherein the visual aspects comprise at least one of vehicle approach angle, receptacle orientation, receptacle type, receptacle size, and receptacle color.

6. The waste management system of claim 1, further comprising one or more sensors configured to monitor servicing of receptacles, wherein the controller is communicatively coupled to the one or more sensors and configured to transmit and store the image data and other waste-related data in response to receiving a signal indicative of servicing the receptacle from the one or more sensors.

7. A waste management system, comprising:
    a waste detector mounted onboard a service vehicle and configured to capture image data of a receptacle encountered by the service vehicle;
    a location device configured to detect a location of the service vehicle; and
    a controller in communication with the waste detector and the location device, the controller configured to:
        determine a location of the service vehicle detected at a time of image data capturing;
        receive, from the waste detector, image data of a receptacle serviced by the service vehicle and location signal data associated with the receptacle;
        recognize the receptacle within the image data;
        train a matching algorithm classifier by providing image data of the recognized receptacle and customer observable indicia data;
        compare the location of the service to known customer data including receptacle-customer signal data;
        associate a known customer with the recognized receptacle based on the location of the service and the location signal data; and
        perform a process related to at least one of transmitting and storing of the image data and other waste-related data associated with the receptable serviced by service vehicle.

8. The waste management system of claim 7, wherein the location device comprises an electronic receiver configured to communicate with one or more of a satellite, a local radio, or laser transmitting system to determine a relative geographical location.

9. The waste management system of claim 7, further comprising one or more sensors configured to monitor servicing of receptacles, wherein the controller is communicatively coupled to the one or more sensors and configured to transmit and store the image data and other waste-related data in response to receiving a signal indicative of servicing the receptacle from the one or more sensors.

10. A non-transitory computer readable medium containing computer-executable programming instructions for performing a method of waste service management, the method comprising:
    receiving, from a waste detector mounted onboard a service vehicle, image data of a receptacle serviced by the service vehicle and location signal data associated with the receptacle;
    recognizing the receptacle within the image data;

training a matching algorithm classifier by providing image data of the recognized receptacle and customer observable indicia data;

comparing the image data to known customer data including receptacle-customer signal data;

associating a known customer with the recognized receptacle based on the image data and the location signal data; and performing a process related to at least one of transmitting and storing of the image data and other waste-related data associated with the receptable serviced by service vehicle.

11. The non-transitory computer readable medium of claim 10, wherein the computer-executable programming instructions perform the method further comprising:

recognizing observable indicia on or around the receptable that are linked to the known customer.

12. The non-transitory computer readable medium of claim 11, wherein the observable indicia comprise at least one of a bar code and writing on or around the receptable that are linked to the known customer.

13. The non-transitory computer readable medium of claim 10, wherein the computer-executable programming instructions perform the method further comprising:

recognizing visual aspects of the receptable that are unique to the known customer.

14. The non-transitory computer readable medium of claim 13, wherein the visual aspects of the receptable that are unique to the known customer comprise at least one of vehicle approach angle, receptacle orientation, receptacle type, receptacle size, and receptacle color.

15. The non-transitory computer readable medium of claim 10, wherein the computer-executable programming instructions perform the method further comprising:

monitoring one or more sensors configured to monitor servicing of receptacles; and transmitting and storing of the image data and other waste-related data in response to receiving a signal indicative of servicing the receptacle from the one or more sensors.

16. The non-transitory computer readable medium of claim 10, wherein the computer-executable programming instructions perform the method further comprising:

monitoring a location device configured to detect a location of the service vehicle;

determining a location of the service vehicle detected at a time of image data capturing;

comparing the location of the service to the known customer data; and associating the known customer with the recognized receptacle at least in part based on the location of the service.

17. The non-transitory computer readable medium of claim 16, wherein the computer-executable programming instructions perform the method further comprising:

communicating, by an electronic receiver, with one or more of a satellite, a local radio, or laser transmitting system to determine a relative geographical location.

* * * * *